(12) United States Patent
Murata et al.

(10) Patent No.: US 7,005,313 B2
(45) Date of Patent: Feb. 28, 2006

(54) SEMICONDUCTOR DYNAMIC SENSOR, AND METHODS OF TRANSPORT AND COLLET SUCTION FOR THE SAME

(75) Inventors: Minoru Murata, Obu (JP); Toshiya Ikezawa, Kariya (JP); Tetsuro Yano, Handa (JP)

(73) Assignee: Denso Corporation, Kariya (JP)

( * ) Notice: Subject to any disclaimer, the term of this patent is extended or adjusted under 35 U.S.C. 154(b) by 1 day.

(21) Appl. No.: 10/771,461

(22) Filed: Feb. 5, 2004

(65) Prior Publication Data

US 2004/0187575 A1    Sep. 30, 2004

(30) Foreign Application Priority Data

Mar. 28, 2003 (JP) .............................. 2003-90971

(51) Int. Cl.
*H01L 21/58* (2006.01)

(52) U.S. Cl. .................. 438/51; 414/752.1; 414/941
(58) Field of Classification Search ................ 73/493, 73/514.32, 504.12; 438/50, 51; 414/752.1, 414/941
See application file for complete search history.

(56) References Cited

U.S. PATENT DOCUMENTS

| 5,362,681 A | * | 11/1994 | Roberts et al. ............. 438/464 |
| 5,558,482 A | * | 9/1996 | Hiroki et al. ............... 414/941 |
| 6,276,207 B1 | * | 8/2001 | Sakai et al. ............... 73/514.32 |
| 6,383,833 B1 | * | 5/2002 | Silverbrook ................ 438/81 |
| 6,675,666 B1 | * | 1/2004 | Maruyama et al. ........ 73/865.8 |
| 2001/0055836 A1 | | 12/2001 | Kunda |

FOREIGN PATENT DOCUMENTS

| JP | A-S56-87332 | 7/1981 |
| JP | A-H05-235490 | 9/1993 |

* cited by examiner

*Primary Examiner*—John E. Chapman
(74) *Attorney, Agent, or Firm*—Posz Law Group, PLC

(57) ABSTRACT

A semiconductor dynamic sensor has a displacement portion, which is composed of a movable electrode and first and second fixed electrodes, formed in a semiconductor substrate. The movable electrode is displaced in response to applied acceleration, so that capacitance between the movable electrode and each of the first and second fixed electrodes changes. Therefore, the applied acceleration can be detected based on the capacitance change. A plurality of rectangular-shaped suction portions is provided at four corners on the surface of the semiconductor substrate. By sucking the suction portions using a collet check, the semiconductor dynamic sensor such can be transported without damaging the displacement portion.

3 Claims, 4 Drawing Sheets

SEMICONDUCTOR DYNAMIC SENSOR, AND METHODS OF TRANSPORT AND COLLET SUCTION FOR THE SAME

CROSS REFERENCE TO RELATED APPLICATION

This application is based on Japanese Patent Application No. 2003-90971 filed on Mar. 28, 2003, the disclosure of which is incorporated herein by reference.

BACKGROUND OF THE INVENTION

1. Field of the Invention

The present invention relates to a semiconductor dynamic sensor in which a displacement portion, having beam structure and being displaced in response to applied dynamic force, is formed in a semiconductor substrate to output a signal according to a displacement amount of the displacement portion. The present invention also relates to methods of transport and collet suction for the semiconductor dynamic sensor.

2. Description of Related Art

As an example of an acceleration sensor, a semiconductor acceleration sensor is disclosed in U.S. Pat. Ser. No. 2001/55836 A1 (JP-A-2002-5951). This semiconductor acceleration sensor includes a displacement portion comprising a fixed electrode and a movable electrode. Further, this sensor outputs a signal representing a change of capacitance between the fixed electrode and the movable electrode. This change of capacitance corresponds to a displacement amount of the movable electrode in response to an acceleration change. This sensor is mounted on a processing circuit chip.

FIG. 6 shows an example of the above semiconductor acceleration sensor. As shown in this figure, a displacement portion 4 is formed in a semiconductor acceleration sensor 1. The displacement portion 4 includes a fixed electrode 2 and a movable electrode 3. Each of the electrodes 2, 3 has beam structure and these electrodes 2, 3 face each other. Further, these electrodes 2, 3 are separated from each other and there is a clearance between them. Furthermore, a plurality of electrode pads 5–7 and a reference electrode pad 8 are formed on a surface of the semiconductor acceleration sensor 1. Each of the pads 5–7 corresponds to the fixed electrode 2 or the movable electrode 3. The reference electrode pad 8 is used for voltage reference. The pads 5–7 output a signal representing a capacitance which changes based on displacement of the movable electrode 3.

In the above semiconductor acceleration sensor 1, detection accuracy may deteriorate according to accuracy of a mounting position relative to a processing circuit chip. It is unstable if bonding material is used to fix the semiconductor acceleration sensor 1 on the processing circuit chip. Accordingly, an adhesive film 9 is stuck to a bottom surface of the semiconductor acceleration sensor 1 as shown in FIG. 7 before mounting on the circuit chip. Then, the semiconductor acceleration sensor 1 is sucked by a collet chuck and mounted on the processing circuit chip. The collet chuck is an apparatus for grasping objects. Here, it is supposed to be a type which grasps objects by air suction.

Recently, the semiconductor acceleration sensor 1, for example, is used for VSC (Vehicle Stability Control), and high sensitivity and high accuracy are desired in the semiconductor acceleration sensor 1. In order to realize this, it is necessary to further reduce elasticity of the adhesive film 9 sticking to the semiconductor acceleration sensor 1.

However, it is difficult to stick an adhesive film 9 with low elasticity to the bottom surface of the semiconductor acceleration sensor 1 before mounting. Accordingly, the adhesive film 9 with low elasticity is stuck to the processing circuit tip in advance, and the semiconductor acceleration sensor 1 is mounted. That is, there is no adhesive film 9 on the bottom surface of the semiconductor acceleration sensor 1 before mounting. In addition, the displacement portion 4 of the semiconductor acceleration sensor 1 is easy to be displaced in response to slight acceleration because of its high response characteristic. Therefore, air is sucked from a clearance between the fixed electrode 2 and the movable electrode 3 when a collet chuck 10 sucks the semiconductor acceleration sensor 1. As a result, as shown in FIG. 8, the displacement portion 4 may be damaged.

SUMMARY OF THE INVENTION

In view of the foregoing problems, it is an object of the present invention to provide a semiconductor dynamic sensor which can prevent damage of a displacement portion in collet suction, in its structure for detecting applied dynamic force based on displacement of the displacement portion.

It is another object of the present invention to provide methods of transport and collet suction for the above semiconductor dynamic sensor.

In order to achieve the above objects, a suction portion is formed in a region which does not overlap the displacement portion on a semiconductor substrate of the semiconductor dynamic sensor. The suction portion is a flat portion whose area is larger than a contact area of a tip of a collet chuck. Since only the suction portion is sucked by the collet chuck in the collet suction of the semiconductor substrate, air suction from the displacement portion does not occur. Therefore, damage of the displacement portion can be prevented.

Further, a plurality of the suction portions can be also formed. In this case, stable suction of the semiconductor substrate can be achieved because the collet chuck sucks a plurality of the suction portions.

Further, a plurality of the suction portions can be also formed at corners of the semiconductor substrate. In this case, most stable suction of the semiconductor substrate can be achieved.

Further, the suction portion can be also formed so that it has no step portion and no projection of wiring pattern. In this case, air leakage from a clearance between the collet chuck and a surface of the semiconductor substrate can be reduced as small as possible.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE
PRESENTLY PREFERRED EMBODIMENTS

Figure 1:
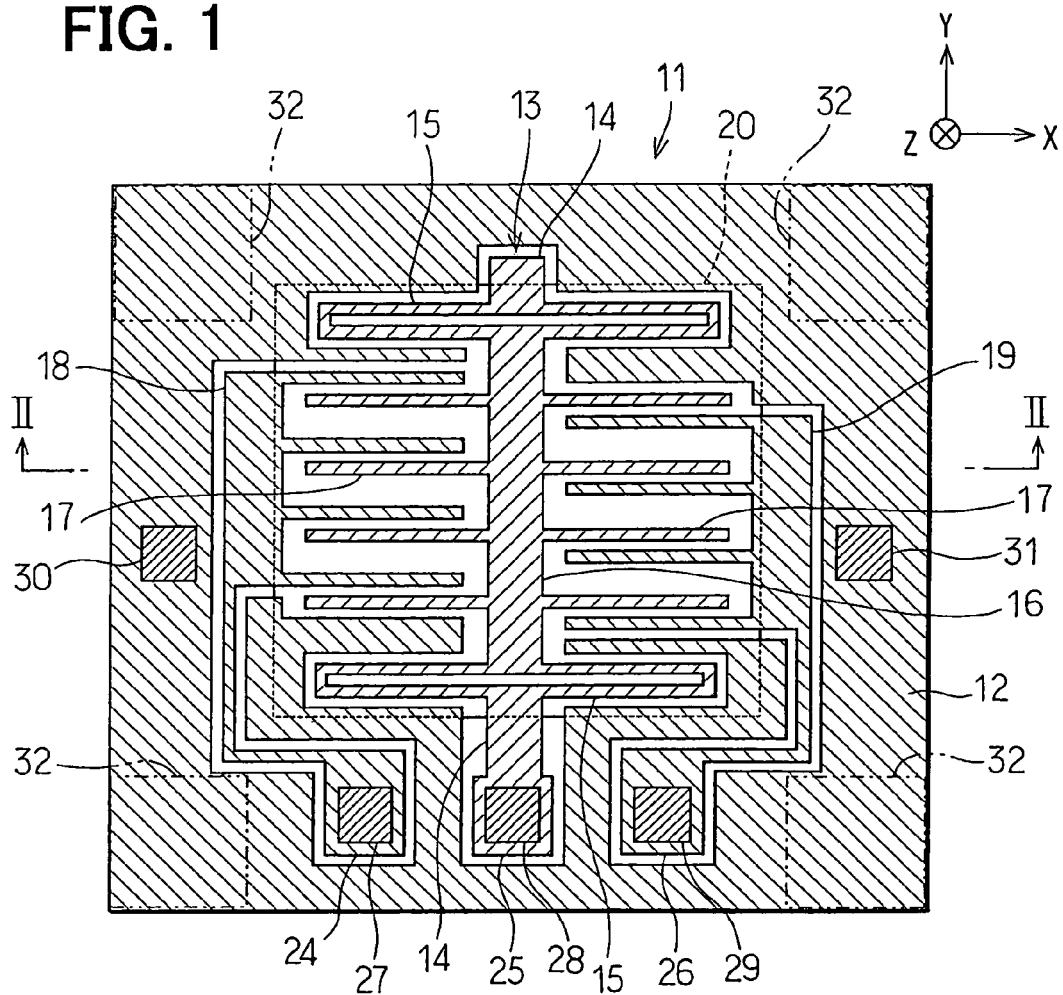
FIG. 1 is a schematic plan view showing a semiconductor acceleration sensor according to an embodiment of the present invention.

A semiconductor acceleration sensor 11 shown in FIG. 1 is formed by performing well-known micro-machine processing, which utilizes semiconductor processing technique, in a semiconductor substrate 12.

As shown in FIG. 1, a movable portion 13 comprises an anchor portion 14, a spring portion 15, a weight portion 16 and a movable electrode 17. The spring portion 15 has a rectangular frame-shape and is supported by the anchor portion 14. The weight portion 16 is connected to the spring portion 15. The movable electrode 17 having a comb-shape is formed at both sides of the weight portion 16. To the contrary, a first fixed electrode 18 having a comb-shape is formed so that it faces one side (left side in the figure) of the movable electrode 17. Further, a second fixed electrode 19 is formed so that it faces the other side (right side in the figure) of the movable electrode 17. The movable electrode 17 and the fixed electrodes 18, 19 are separated from each other and there is a clearance between them. These portions 13–19 compose a displacement portion 20.

Figure 2:
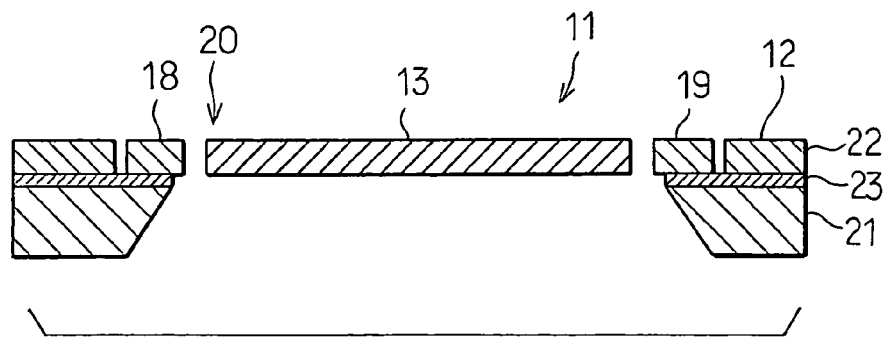
FIG. 2 is a cross-sectional view taken along line II—II in FIG. 1.

As shown in FIG. 2, a semiconductor substrate 12 is a SOI substrate in which an insulation layer 23 is formed between a first semiconductor layer 21 and a second semiconductor layer 22. A part of the first semiconductor layer 21 and the insulation layer 23 is removed in an area where the movable portion 13 and the fixed electrodes 18, 19 are formed, so that the second semiconductor layer 22 is exposed.

The above semiconductor acceleration sensor will be manufactured as follows. Firstly, by depositing aluminum over pads 24–26 on the SOI substrate, electrode pads 27–29 are formed on the corresponding one of the pads 24–26. Further, reference electrode pads 30, 31 for voltage reference are formed on a predetermined portion in the semiconductor substrate 12.

Next, a plasma SiN film is built up after polishing the back of the SOI substrate, and a predetermined pattern is formed by etching the plasma SiN film.

Furthermore, the surface of the SOI substrate is coated with a PIQ (Polyimide) film, and a pattern corresponding to the movable portion 13 and the fixed electrodes 18, 19 is formed by etching the PIQ film. Then, a resist is coated over the PIQ film as a protective film. Further, by using the plasma SiN film on the back of the SOI substrate as a mask, the SOI substrate is etched in an aqueous solution (e.g., KOH) by deep-etching technique. In the deep-etching technique, the insulation layer 23 functions as an etching stopper because an etching speed in the insulation layer 23 is slower than that in Si.

Thereafter, the insulation layer 23 and the plasma SiN film are removed by an aqueous solution of HF, and a resist protecting the surface of the SOI substrate is removed. Then, by using the PIQ film as a mask, a through hole is formed in the second semiconductor layer 22 by dry-etching. By making the through hole, the movable portion 13 and the fixed electrodes 18, 19 are formed. Then, the semiconductor acceleration sensor 11 is completed by removing the PIQ on the surface of the SOI substrate by $O_2$ ashing.

In the above semiconductor acceleration sensor 11, the anchor portions 14, which are end portions of the movable portion 13, are supported by the insulation layer 23. In addition, the fixed electrodes 18, 19 are cantilever-supported by the insulation layer 23.

In the above semiconductor acceleration sensor 11, the weight portion 16 is displaced when acceleration is applied to the movable portion 13 in a sensing direction (Y-axis direction in FIG. 1). In this case, in a distance between a sensing surface of the movable electrode 17 and a sensing surface of the first fixed electrode 18 and a distance between a sensing surface of the movable electrode 17 and a sensing surface of the second fixed electrode 19, one increases if the other decreases. Here, there is capacitance between the sensing surface of the movable electrode 17 and the sensing surface of each of the first and second fixed electrodes 18, 19. Therefore, the capacitance changes when acceleration is applied. Accordingly, applied acceleration can be detected by a differential detection circuit of a processing circuit chip (not shown).

Figure 6:
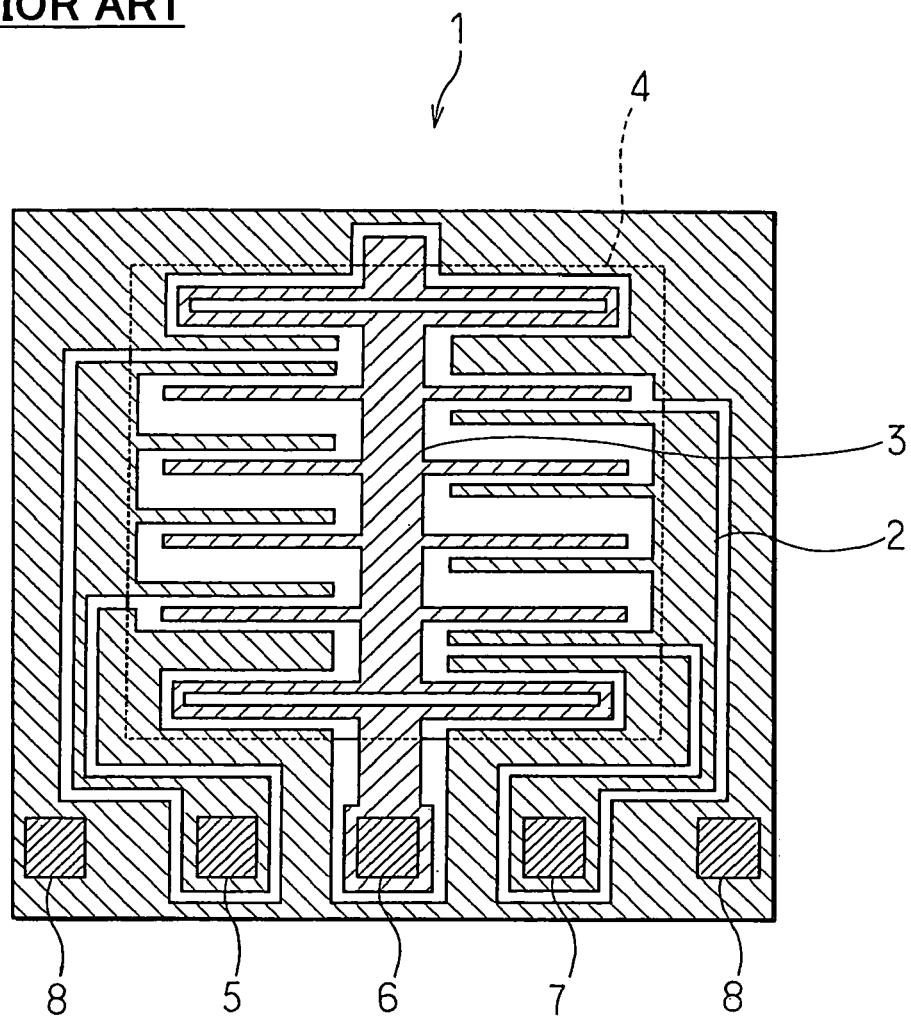
FIG. 6 is a schematic plan view showing a semiconductor acceleration sensor according to a prior art.
Figure 7:
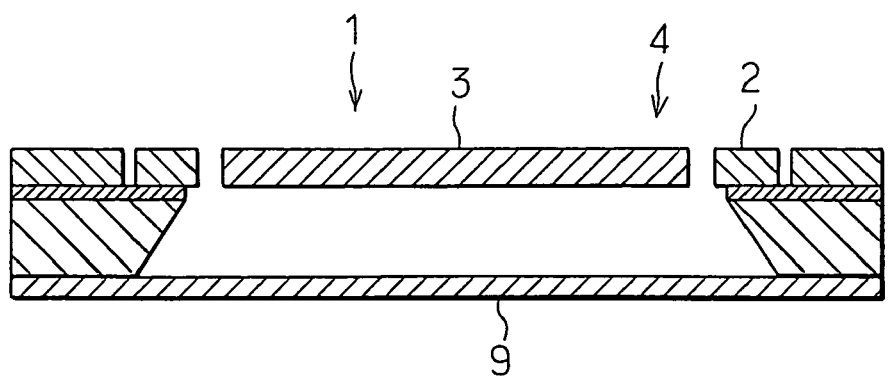
FIG. 7 is a cross-sectional view showing a stuck adhesive film according to the prior art.

Here, in the semiconductor acceleration sensor 11, a plurality of suction portions 32, having a rectangular shape, is formed at four corners on the surface of the semiconductor substrate 12. The suction portions 32 are formed by intentionally providing flat regions having no pattern on the surface of the semiconductor substrate 12. Further, the suction portions 32 fit with a tip shape of a collet chuck for suction transport and their area is larger than a contact area of a tip of the collet chuck. In the prior art, the reference electrode pads 30, 31 are generally provided in a position where the suction portions 32 should be provided (FIG. 6). However, in the embodiment, the reference electrode pads 30, 31 are provided in a position separated from the suction portions 32 in order to provide the suction portions 32 at the four corners on the surface of the semiconductor substrate 12.

Figure 3:
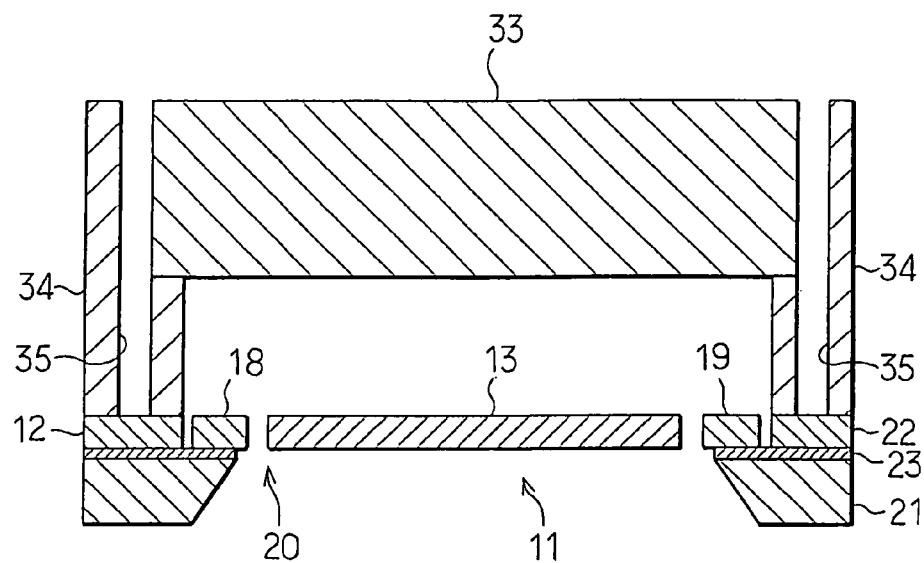
FIG. 3 is a cross-sectional view showing suction of the semiconductor acceleration sensor by a collet chuck.

In FIG. 3, a collet chuck 33 has a rectangular shape corresponding to a shape of the semiconductor substrate 12, and sucking portions 34 are formed so that they protrude at the four corners of the collet chuck 33. Further, the sucking portions 34 have a suction hole 35 and correspond to the suction portion 32 of the semiconductor substrate 12.

Figure 4:
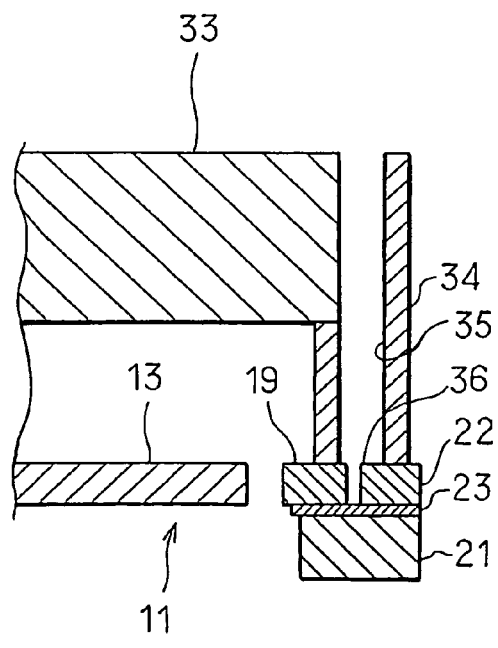
FIG. 4 is across-sectional view showing an example of a suction portion including a step portion.
Figure 5:
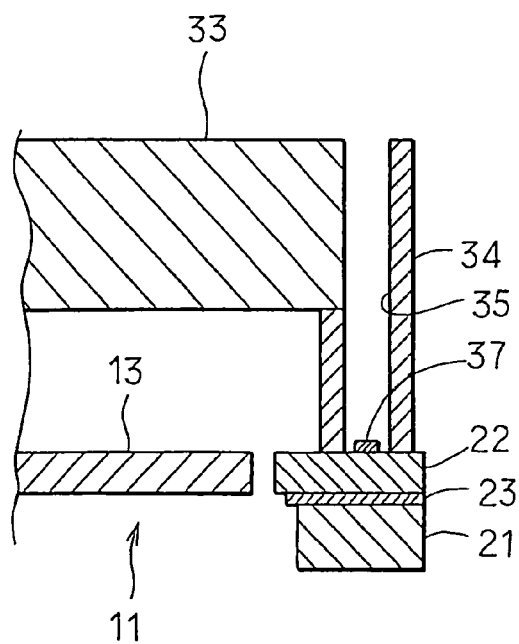
FIG. 5 is across-sectional view showing an example of a suction portion including a wiring pattern.

While the semiconductor substrate 12 is transported by suction using the collet chuck 33, it is necessary to reduce air leakage from a clearance between the collet chuck 33 and the top surface of the semiconductor substrate 12 as small as possible. Therefore, the suction portion 32 is formed so that it does not contain a step portion 36 (FIG. 4) or a wiring pattern 37 of aluminum (FIG. 5).

When a transport apparatus (not shown) is driven, the collet chuck 33 contacts the surface of the semiconductor substrate 12 in a positioning state. In this case, each of the sucking portions 34 contacts the corresponding one of the suction portions 32. Then, by sucking the semiconductor substrate 12 using the collet chuck 33, the semiconductor acceleration sensor 11 can be stably transported and mounted at a predetermined portion in the processing circuit chip. In this case, it is possible to stick an adhesive film to the processing circuit chip in advance for preventing a position shift of the semiconductor acceleration sensor 11 mounted on the processing circuit chip.

Figure 8:
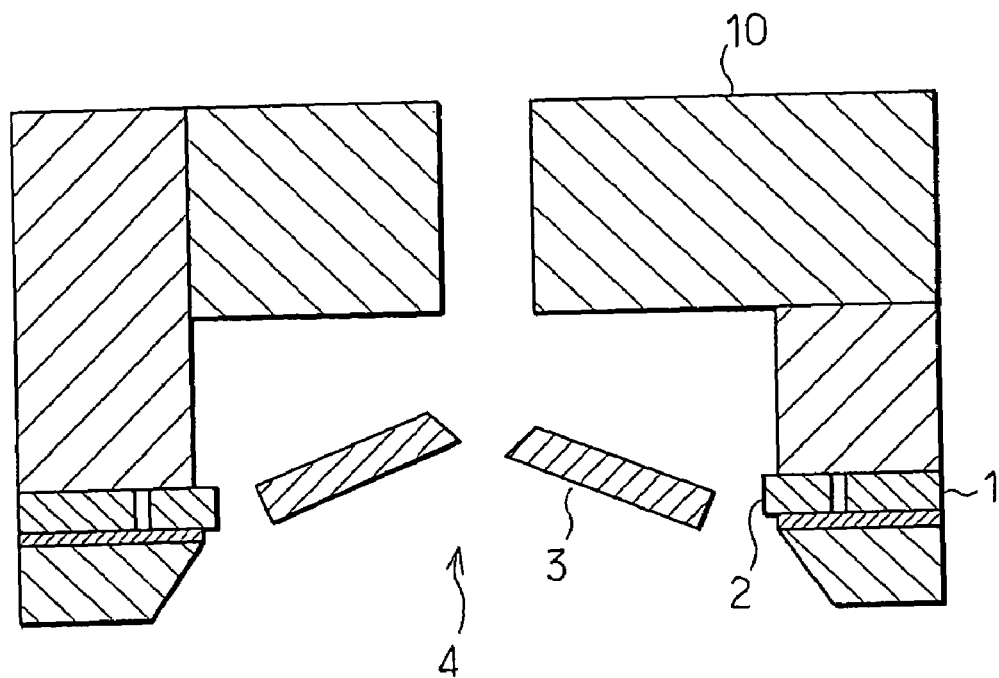
FIG. 8 is a cross-sectional view showing damage of a displacement portion according to the prior art.

In the embodiment, the suction portions 32 having no pattern are provided in rectangular regions at the four corners on the surface of the semiconductor acceleration sensor 11, and the collet chuck 33 sucks the suction portions 32. Therefore, in the suction state by the collet chuck 33, the semiconductor acceleration sensor 11 can be transported without sucking air from the displacement portion 20 formed in the semiconductor acceleration sensor 11. Accordingly, damage of the displacement portion 20 can be prevented certainly, while air suction from the displacement portion occurs when the collet chuck sucks a semiconductor acceleration sensor, which has no adhesive film on the bottom surface, according to a prior art (FIG. 8).

In addition, the semiconductor acceleration sensor 11 can be formed only by shifting a conventional position of the electrode pads and providing the suction portions 32. Therefore, the semiconductor acceleration sensor 11 can be realized at low cost.

The present invention is not limited to the above embodiment. For example, the present invention can be applied to the other semiconductor dynamic sensors, such as an angular rate sensor and a yaw rate sensor, not limited to the acceleration sensor.

What is claimed is:

1. A method of transporting a semiconductor dynamic sensor, which includes a semiconductor substrate, a displacement portion formed in the semiconductor substrate in beam structure, the displacement portion being displaceable in response to applied dynamic force, and a plurality of suction portions formed on a surface of the semiconductor substrate in regions separated from the displacement portion, each suction portion being a flat portion having an area larger than a predetermined area, wherein the method comprises:

placing, on the semiconductor substrate, a collet chuck having a plurality of tips having respective suction holes so that the tips contact the suction portions, each hole having an area smaller than the predetermined area of the flat portion;

drawing air through the holes to hold the semiconductor substrate by suction force applied to the suction portion; and moving the collet chuck with the semiconductor substrate.

2. The method according to claim 1, wherein the suction portions are formed at corners of the semiconductor substrat.

3. The method according to claim 1, wherein the suction portions have no Step portion and no wiring pattern to provide the flat portion.

* * * * *